United States Patent
Bhaggan et al.

(10) Patent No.: US 10,420,353 B2
(45) Date of Patent: Sep. 24, 2019

(54) FAT COMPOSITION AND FAT BLEND

(71) Applicant: Bunge Loders Croklaan B.V., Wormerveer (NL)

(72) Inventors: Krishnadath Bhaggan, Wormerveer (NL); Willem Dekker, Wormerveer (NL); Jun Ma, Wormerveer (NL); Jeanine Werleman, Wormerveer (NL)

(73) Assignee: Bunge Loders Croklaan B.V., Wormerveer (NL)

( * ) Notice: Subject to any disclaimer, the term of this patent is extended or adjusted under 35 U.S.C. 154(b) by 154 days.

(21) Appl. No.: 15/122,968

(22) PCT Filed: Mar. 2, 2015

(86) PCT No.: PCT/EP2015/054318
§ 371 (c)(1),
(2) Date: Sep. 1, 2016

(87) PCT Pub. No.: WO2015/132206
PCT Pub. Date: Sep. 11, 2015

(65) Prior Publication Data
US 2017/0071224 A1    Mar. 16, 2017

(30) Foreign Application Priority Data

Mar. 3, 2014 (EP) ..................................... 14275038

(51) Int. Cl.
| | | |
|---|---|---|
| *A23G 1/38* | (2006.01) | |
| *A23D 9/00* | (2006.01) | |
| *C11C 3/10* | (2006.01) | |
| *A23G 1/36* | (2006.01) | |
| *A23G 3/40* | (2006.01) | |
| *A23D 9/02* | (2006.01) | |

(52) U.S. Cl.
CPC ................. *A23G 1/38* (2013.01); *A23D 9/00* (2013.01); *A23D 9/02* (2013.01); *A23G 1/36* (2013.01); *A23G 3/40* (2013.01); *C11C 3/10* (2013.01); *A23V 2002/00* (2013.01)

(58) Field of Classification Search
CPC ... A23G 1/38; A23G 1/36; A23G 3/40; A23D 9/00; A23D 9/02; C11C 3/10
USPC .......................................... 426/89, 306, 601
See application file for complete search history.

(56) References Cited

U.S. PATENT DOCUMENTS

| | | | |
|---|---|---|---|
| 4,214,012 A * | 7/1980 | Ainger et al. | |
| 8,741,372 B2 * | 6/2014 | Cruz Serna et al. | |
| 2006/0172057 A1 * | 1/2006 | Bleenewerck | |
| 2015/0056357 A1 | 2/2015 | Bhaggan et al. | |

FOREIGN PATENT DOCUMENTS

| | | |
|---|---|---|
| EP | 0803196 A1 | 10/1997 |
| EP | 2042607 A1 | 4/2009 |
| EP | 2671455 A1 | 12/2013 |
| EP | 2839750 A1 | 2/2015 |
| GB | 1444820 A | 8/1976 |
| JP | 2008-122993 A | 5/2008 |
| JP | 2008-228610 A | 10/2008 |
| WO | 83/00161 A1 | 1/1983 |
| WO | 03/037095 A1 | 5/2003 |
| WO | 2004/017745 A1 | 3/2004 |
| WO | 2004/112492 A1 | 12/2004 |
| WO | 2009/062663 A2 | 5/2009 |
| WO | 2012/084420 A1 | 6/2012 |

OTHER PUBLICATIONS

Adhikari et al., "Enzymatic and Chemical Interesterification of Rice Bran Oil, Sheaolein, and Palm Stearin and Comparative Study of Their Physicochemical Properties," Journal of Food Science, 77: 1284-1291 (2012).
Ishikawa et al., "Polymorphic Behavior of Palm Oil and Modified Palm Oils," Food Science and Technology International Tokyo, 3: 77-81 (1997).
Jha, "Modern Technology of Confectionery Industries with Formulae and Processes," NIR Project Consultancy Services, 208 (2003).
Loders Croklaan Press Release, (Nov. 19, 2013).
Pernetti et al., "Structuring of edible oils by alternatives to crystalline fat," Current Opinion in Colloid & Interface Science, 12: 221-231 (2007).
Soares et al., "Chemical Interesterification of Blends of Palm Stearin, Coconut Oil, and Canola Oil: Physicochemical Properties," Journal of Agricultural and Food Chemistry, 60: 1461-1469 (2012).
Trancendim Brochure (2010).
Extended European Search Report issued in European Patent Application No. 13275192.6 dated Feb. 25, 2014.
International Search Report issued in corresponding International Patent Application No. PCT/EP2015/054318 dated May 11, 2015.
Office Action issued in related European Patent Application No. 15707369.3 dated Nov. 2, 2017.
Nature Shop: Shea Olein (Butyrospermum Parkij).
Extended European Search Report issued in corresponding European Patent Application No. 18196111.1 dated Feb. 7, 2019.
Jeon et al., "Modification of Palm Mid Fraction with Stearic Acid by Enzymatic Acidolysis Reaction," Journal of the Korean Society of Food Science and Nutrition, 38: 479-485 (2009) (see English abstract).
Marangoni et al., "Trends in Interesterification of Fats and Oils," Retrieved from the Internet: http://ilsina.org/wp-content/uploads/sites/06/2016/06/PPT1Marangoni-June-2012.pdf (2019).

(Continued)

*Primary Examiner* — Helen F Heggestad
(74) *Attorney, Agent, or Firm* — Morgan, Lewis & Bockius LLP

(57) ABSTRACT

A fat composition comprises: greater than 75% by weight palmitic acid and stearic acids; from 1 to 25% by weight oleic acid; and greater than 20% by weight of combined $P_2St$ and $PSt_2$ triglycerides, wherein P is palmitic acid and St is stearic acid; wherein the fat composition has a weight ratio of $P_2St$:PPP triglycerides of greater than 0.5.

14 Claims, No Drawings

(56) References Cited

OTHER PUBLICATIONS

Mojovic et al., "Rhizopus arrhizus lipase-catalyzed interesterification of the midfraction of palm oil to a cocoa butter equivalent fat," Enzyme and Microbial Technology, 15: 438-443 (1993).

office Action issued in corresponding Japanese Patent Application No. 2016-555549 dated Nov. 6, 2018 (see partial English translation).

\* cited by examiner

FAT COMPOSITION AND FAT BLEND

This invention relates to a fat composition, to a fat blend comprising the composition, and to confectionery products.

Triglyceride fats are used extensively in the confectionery industry. Many fats require a tempering step to convert the fat into the most stable crystalline form.

Chocolate is composed of triglycerides in unstable polymorphic crystal forms and has a tendency to undergo physical changes associated with the transitions of the unstable forms into a more stable form. These physical changes are likely to affect adversely the appearance and/or texture of the chocolate. Depending on the process conditions used, cocoa butter can be crystallized into different crystal forms, each of which possess a distinct melting point and density. The purpose of tempering is to produce sufficient, uniform seed crystals to ensure that the temper state is stable and that subsequent crystallisation of the whole of the chocolate mass occurs into the stable crystalline form. Properly tempered chocolate is important for qualities such as mould release (contraction), hardness, snap, mouthfeel, flavour release, gloss and resistance to fat bloom.

Similarly, some fats intended to replace cocoa butter in chocolate-like confectionery need to be tempered for the same reasons.

Crystallisation starters are frequently added to triglyceride fats in order to facilitate tempering of the fats. Modern Technology of Confectionery Industries with Formulae & Processes, Minni Jha, 2003, Asia Pacific Business Press Inc, 8178330997, page 208 describes crystallisation starters as being high melting triglycerides with a melting point of 55° C. to 70° C., which, when included in a fat in a proportion of 2.5 to 3.0% aid the tempering procedure. The crystallisation starter forms crystals as the fat is cooled from the molten state and these crystals allow the fat to be produced in the desired polymorphic crystal form.

EP-A-803196 discloses a hard butter additive composition comprising the middle melting point fraction of random interesterified palm stearin. The hard butter additive composition is used to prevent fat blooming and/or graining and improve mold removability of hard butter products such as chocolate or centre cream without a tempering process.

WO 2012/084420 describes a water-in-oil emulsion comprising 50 to 85 wt. % of an aqueous phase and 15 to 50 wt. % of a fat phase, wherein the fat phase comprises HOH triglycerides in an amount of 8 to 50% of the total weight of the fat phase, and HHH triglycerides in an amount of 1 to 6% of the total weight of the fat phase, wherein at least 25% of said HHH triglycerides contain at least two different fatty acid residues, where "H" denotes a saturated fatty acid residue with 16 to 24 carbon atoms and "O" an oleic acid residue.

Our copending European patent application no 13275192.6 filed on 22 Aug. 2013 relates to a fat composition that can be used as a crystallization starter and which comprises: greater than 70% by weight palmitic acid; and from 2 to 12% by weight P2O triglycerides (i.e., triglycerides having two palmitoyl groups and one oleoyl group, PPO and POP), wherein P is palmitic acid and O is oleic acid; wherein the fat composition has a weight ratio of SSO:SOS triglycerides of greater than 0.3, and wherein S is stearic or palmitic acid and O is oleic acid.

Often, food products that contain liquid oils also contain a structuring agent. Structuring agents are generally fats that are solid at room temperature (20° C.) and that provide structure to the oil phase. For example, some confectionery filling fats are mixtures of liquid oil and a structuring agent with the structuring agent providing a degree of firmness to the mixture by virtue of forming a crystal network in the liquid oil phase.

There remains a need for fat compositions that can be used as crystallization starters that can improve the crystallization of fat or fat blends in confectionery or bakery applications without adversely affecting the desirable properties of the fat or fat blends. In particular, there is a need for crystallization starters that are based on non-hydrogenated fats. There is also a need for crystallization starters having these advantages that can provide a structuring effect in a liquid oil or fat.

According to the present invention, there is provided a fat composition comprising:
  greater than 75% by weight palmitic acid and stearic acids;
  from 1 to 25% by weight oleic acid; and
  greater than 20% by weight of combined $P_2St$ and $PSt_2$ triglycerides,
  wherein P is palmitic acid and St is stearic acid;
wherein the fat composition has a weight ratio of $P_2St$:PPP triglycerides of greater than 0.5.

Also provided by the invention is a fat blend comprising from 0.5 to 10% by weight of the fat composition of the invention.

A further aspect of the invention is a process for making the fat composition of the invention comprising the following steps:
  (a) providing a palm oil stearin (preferably by fractionating palm oil) having an iodine value (IV) of from 10 to 40;
  (b) interesterifying the palm oil stearin of step (a) with a source of stearic acid; and
  (c) fractionating the interesterified product of step (b) to produce a stearin fraction at a yield based on the interesterified product of step (b) of from 8 to 25% by weight.

Also provided by the invention in another aspect is a confectionery product comprising:
  at least 20% by weight of the fat blend according to the invention; and
  at least 30% by weight sugar.

The invention also provides the use of a fat composition according to the invention to promote, enhance or accelerate the crystallization of fat or fat blends in confectionery or bakery applications.

Also provided by the invention is the use of a fat composition according to the invention for providing structure in a fat or a fat blend.

Further provided by the invention is the use of a fat composition according to the invention to promote, enhance or accelerate the crystallization of fat or fat blends and to provide structure in the fat or fat blend.

The fat composition of the invention comprises greater than 75% by weight in total of palmitic acid and stearic acids. Most if not all of the palmitic and stearic acids are present in covalently bonded form in glycerides (i.e., triglycerides and any mono- and di-glycerides that might be present). Preferably, the fat composition of the invention comprises greater than 80% by weight, such as from 80% to 90% by weight, of total palmitic and stearic acid.

The fat composition of the invention preferably comprises from 10% to 60% by weight of stearic acid.

The fat composition of the invention preferably comprises from 30 to 75% by weight palmitic acid.

The fat composition of the invention comprises from 1 to 25% by weight of oleic acid, more preferably from 5 to 25% by weight, such as from 5 to 20% by weight, 7 to 18% by weight or 9 to 15% by weight. Most if not all of the oleic acid is present in covalently bonded form in glycerides (i.e., triglycerides and any mono- and di-glycerides that might be present).

The fat composition of the invention comprises greater than 20% by weight of combined $P_2St$ and $PSt_2$ triglycerides, wherein P is palmitic acid and St is stearic acid, preferably from 20% to 60% by weight of combined $P_2St$ and $PSt_2$ triglycerides, even more preferably from 25% to 55% by weight of combined $P_2St$ and $PSt_2$ triglycerides.

The fat composition of the invention preferably comprises greater than 55% by weight in total of the triglycerides PPP, $P_2St$ and $PSt_2$, wherein P is palmitic acid and St is stearic acid, preferably greater than 58% by weight, most preferably from 60 to 70% by weight.

As used herein, $P_2St$ includes PPSt and PStP and $PSt_2$ includes PStSt and StPSt.

All percentages of fatty acids used herein refer to fatty acids bound as acyl groups in glycerides and are by weight based on total C12 to C24 fatty acids present in the fat composition as acyl groups in glycerides. The levels of fatty acids present in the compositions of the invention can be determined by methods well-known to those skilled in the art such as GC-FAME.

The term fatty acid, as used herein, refers to straight chain saturated or unsaturated (including mono-, di- and polyunsaturated) carboxylic acids having from 12 to 24 carbon atoms. The term fat refers generally to compositions that contain a mixture of fatty acid glycerides.

The fat composition of the invention typically comprises more than 90% by weight of triglycerides, more preferably at least 95% by weight triglycerides.

The fat composition has a weight ratio of $P_2St$:PPP triglycerides of greater than 0.5, preferably from 0.5 to 5, such as from 0.5 to 4.

Some fat compositions of the invention that are produced by a process that involves chemical interesterification have a weight ratio of SSO:SOS triglycerides of greater than 0.3, preferably greater than 0.5, even more preferably greater than 0.7, wherein S is stearic or palmitic acid and O is oleic acid. For example SSO includes PPO, PStO, StPO and StStO, where P is palmitic acid and St is stearic acid.

The fat composition of the invention is preferably the stearin fraction of a product obtained by interesterifying a mixture of palm oil stearin and shea olein or a mixture of palm oil stearin and stearic acid. Interesterification may be carried out, for example, chemically using catalysts, such as bases (e.g., sodium methoxide), or enzymatically e.g., using a lipase e.g., from *Rhizopus oryzae* or *Thermomyces lanuginosus*.

Fractionation of fats and oils into higher and lower melting fractions is a technique that is well-known to those skilled in the art. The lower melting fraction is termed an olein and the higher melting fraction is called a stearin. Fractionation may be carried out in the presence of a solvent (wet), such as acetone, or without a solvent (dry). In particular, the fractionation in (c) of the process of the invention may be carried out by dry fractionation.

The fat composition of the invention preferably comprises from 5 to 50% by weight of the triglyceride PPP, wherein P is palmitic acid.

The fat composition preferably comprises more than 12% by weight of stearic acid, more preferably from 13 to 60% % by weight of stearic acid.

The saturated fatty acid (SAFA) content of the fat composition of the invention is preferably from 75 to 95%, preferably 80 to 90%, by weight based on fatty acids present. The monounsaturated fatty acid (MUFA) content of the fat composition of the invention is preferably from 1 to 25% by weight, more preferably from 5 to 20% by weight, based on fatty acids present.

The physical properties of fats are sometimes defined in terms of N values. These indicate the percentage of solid fat in the composition at a given temperature. Thus, the term Nx refers to solid fat content at a temperature of x° C., measured by NMR pulse techniques. Methods for determining N values are ISO method 8292-1 or AOCS Cd 16b-93. The fat compositions of the invention preferably have an N10 of greater than 90 and an N40 of less than 80, such as less than 75 e.g., from 60 to 80.

A preferred fat composition of the invention comprises:
greater than 75% by weight palmitic acid and stearic acids
from 5 to 25% by weight oleic acid; and
from 25 to 60% by weight of combined $P_2St$ and $PSt_2$ triglycerides, wherein
P is palmitic acid and St is stearic acid;
wherein the fat composition has a weight ratio of $P_2St$:PPP triglycerides of from 0.5 to 5.

Another preferred fat composition of the invention comprises:
from 75 to 95% by weight palmitic acid and stearic acids;
from 5 to 20% by weight oleic acid;
from 5 to 50% by weight of the triglyceride PPP; and
from 20 to 60% by weight of combined $P_2St$ and $PSt_2$ triglycerides, wherein
P is palmitic acid and St is stearic acid;
wherein the fat composition has a weight ratio of $P_2St$:PPP triglycerides of from 0.5 to 5.

A further preferred fat composition of the invention is a stearin fraction of an interesterified mixture of palm oil stearin and a source of stearic acid (preferably shea butter, a fraction of shea butter such as shea olein, or stearic acid), which comprises:
greater than 75% by weight palmitic acid and stearic acids;
from 5 to 20% by weight oleic acid; and
greater than 20% by weight of combined $P_2St$ and $PSt_2$ triglycerides,
wherein P is palmitic acid and St is stearic acid;
wherein the fat composition has a weight ratio of $P_2St$:PPP triglycerides of greater than 0.5.

The fat blend of the invention comprises from 0.5 to 10% by weight of the fat composition of the invention, preferably from 1 to 7% by weight, such as from 2 to 5%, or from 2.5 to 3.5%, together with one or more other fats as the balance of the fat blend.

The one or more other fats in the fat blend of the invention preferably include non-hydrogenated palm fractions and/or lauric fats.

The fat blend may comprise at least 30% by weight of one or more non-hydrogenated palm fractions and/or a liquid oil, such as sunflower oil, rape seed oil, high oleic sunflower oil or a mixture of these oils. Preferably, the non-hydrogenated palm fraction is a palm olein, such as a palm olein having an IV of greater than 55 or greater than 60.

In another embodiment, the fat blend comprises at least 80% by weight of a lauric fat component. The lauric fat component is preferably selected from the group consisting of coconut oil, palm kernel oil, fractions of coconut oil, fractions of palm kernel oil, and mixtures thereof.

A preferred fat blend of the invention comprises:

(i) from 1 to 5% by weight of a stearin fraction of an interesterified mixture of palm oil stearin and a source of stearic acid, such as shea olein, which comprises:

greater than 75% by weight palmitic acid and stearic acids;

from 5 to 25% by weight oleic acid; and greater than 20% by weight of combined $P_2St$ and $PSt_2$ triglycerides, wherein P is palmitic acid and St is stearic acid;

wherein the fat composition has a weight ratio of $P_2St$: PPP triglycerides of greater than 0.5; and (ii) from 95 to 99% by weight of one or more other fats selected from: non-hydrogenated palm fractions; blends of non-hydrogenated palm fractions with liquid oils; lauric fats; and mixtures thereof.

The fat composition and fat blend of the invention are preferably of vegetable origin. Fats of vegetable origin are obtained directly or indirectly from vegetable sources. The vegetable fats are preferably refined. The term "refined", as used herein, refers to processes in which the purity of a fat is increased by a process which comprises at least the steps of bleaching, followed by filtering and deodorising (such as by steam refining). The fats are typically not hydrogenated.

Since vegetable fats do not contain significant amounts of cholesterol, the fat compositions and fat blends of the invention preferably contain less than 1%, more preferably less than 0.5%, by weight of cholesterol.

Also, since non-hydrogenated vegetable fats do not contain significant amounts of trans-fats, the fat compositions and fat blends of the invention preferably contain less than 1%, more preferably less than 0.5%, by weight of trans fatty acids.

The fat blend is typically not in the form of an emulsion (such as a water-in-oil or oil-in-water emulsion).

The process for making the fat composition of the invention comprises (a) fractionating a palm oil to obtain a palm oil stearin having an iodine value (IV) of from 10 to 40; (b) interesterifying the palm oil stearin thus obtained with a source of stearic acid (such as cocoa butter, a fraction of cocoa butter, shea butter, a fraction of shea butter such as shea olein, or stearic acid), which source of stearic acid is preferably shea butter, a fraction of shea butter such as shea olein, or stearic acid; and (c) fractionating the interesterified product of step (b) (preferably by dry fractionation) to produce a stearin fraction at a yield based on the interesterified product of step (b) of from 8 to 25% by weight.

The interesterification in (b) may be carried out chemically or enzymatically, but is preferably chemical randomization. The interesterification is preferably carried out in the presence of a suitable catalyst. Sodium methoxide is a preferred catalyst for chemical randomization.

Iodine value may be determined by AOCS Cd 1c-85.

A preferred process for making the fat composition of the invention comprises (a) fractionating a palm oil to obtain a palm oil stearin having an iodine value (IV) of from 10 to 40; (b) interesterifying the palm oil stearin thus obtained with shea olein and/or stearic acid; and (c) fractionating the interesterified product of step (b) to produce a stearin fraction at a yield based on the interesterified product of step (b) of from 8 to 25% by weight.

Another preferred process for making the fat composition of the invention comprises (a) fractionating a palm oil to obtain a palm oil stearin having an iodine value (IV) of from 10 to 40; (b) interesterifying the palm oil stearin thus obtained with shea olein; and (c) dry fractionating the interesterified product of step (b) at a temperature of from 30 to 50° C. to produce a stearin fraction at a yield based on the interesterified product of step (b) of from 8 to 25% by weight.

Yet another preferred process for making the fat composition of the invention comprises (a) fractionating a palm oil to obtain a palm oil stearin having an iodine value (IV) of from 20 to 40; (b) interesterifying the palm oil stearin thus obtained with stearic acid; and (c) fractionating the interesterified product of step (b) by solvent fractionation using acetone as solvent at a temperature of from 15 to 30° C. to produce a stearin fraction at a yield based on the interesterified product of step (b) of from 8 to 25% by weight.

The fat composition of the invention may be used to promote, enhance or accelerate the crystallization of fat or fat blends in confectionery or bakery applications. In other words, the fat composition may be used as a crystallization starter.

Surprisingly, not only does the fat composition of the invention perform as a crystallization starter, it can also provide structuring properties in the fat blend. Consequently, the hardness of the fat blend can be increased, making it more useful in certain food applications.

The fat blend may have a hardness at 20° C. that is greater than that of the one or more fats in the blend without the composition of the invention.

The fat composition and fat blend of the invention may be used in a confectionery product.

The confectionery product of the invention comprises at least 20% by weight of the fat blend according to the invention and at least 30% by weight sugar.

The confectionery product produced according to the invention is typically a chocolate-like product and may, for example, be selected from bars, fillings, biscuit creams and confectionery coatings. The confectionery products will preferably comprise one or more further ingredients such as skimmed milk powder, cocoa butter, nut based material (e.g., hazelnut pieces and/or hazelnut paste) and emulsifier (e.g., lecithin, PGPR, sorbitan tristearate or a mixture thereof). Further optional components include flavouring (e.g., vanilla, vanillin, mint, orange, etc), colourants and inclusions such as confectionery and fruit pieces.

The confectionery product of the invention comprises sugar. Sugars include, for example, sucrose, glucose, fructose and mixtures thereof. The sugar is typically sucrose. The sugar is preferably powdered. Preferably, the sugar is present in the confectionery product of the invention in an amount of from 30 to 70% by weight, more preferably from 35 to 55% by weight, even more preferably from 40 to 50% by weight, based on the weight of the composition.

The confectionery product of the invention preferably comprises the fat blend in an amount of from 20 to 50% by weight, such as from 25 to 40% by weight.

Preferably, the confectionery product comprises at least 5% of milk powder, vegetable milk powder, dairy powder or a mixture thereof. A preferred confectionery product is a confectionery filling comprising at least 5% of a nut based material.

Lecithin is a preferred emulsifier and is preferably present in an amount of up to 1% by weight of the confectionery product, such as from 0.1 to 1% by weight.

The confectionery product may comprise cocoa powder, more preferably in an amount of up to 15% by weight of the confectionery product, such as from 1 to 15% by weight.

A preferred confectionery product of the invention comprises from 35 to 55% by weight of sugar and from 25 to 50% by weight of a fat blend which comprises:

(i) from 1 to 5% by weight of a stearin fraction of the interesterification product of a palm oil stearin with a a source of stearic acid (preferably shea butter, a fraction of shea butter such as shea olein, or stearic acid) which comprises:

greater than 75% by weight palmitic acid and stearic acids;

from 5 to 25% by weight oleic acid; and from 25 to 60% by weight of combined $P_2St$ and $PSt_2$ triglycerides, wherein P is palmitic acid and St is stearic acid;

wherein the fat composition has a weight ratio of $P_2St$:PPP triglycerides of from 0.5 to 5; and (ii) from 95 to 99% by weight of one or more other fats selected from: non-hydrogenated palm fractions; blends of non-hydrogenated palm fractions with liquid oils; lauric fats; and mixtures thereof.

It will be appreciated that the percentage amounts of all of the components in the compositions and products of the invention, including those not mentioned, will add up to 100%.

Coatings may be applied to confectionery or to a bakery product. Confectionery includes ice cream. The confectionery products may also be used as coatings on products that are sold and/or consumed at ambient temperature (i.e., from 5 to 30° C.).

The confectionery products may be used to apply a partial or complete coating to a base product which is preferably a bakery product. Bakery products are typically baked in an oven. The bakery products are preferably made using flour. Examples of bakery products include biscuits, cookies, cakes, donuts and pastries. Cupcakes are particularly preferred examples of baked confectionery products for the invention.

Coated bakery products can be produced by melting the confectionery product (e.g., above 35° C.), applying it to an uncoated bakery product (e.g., by pouring it onto the uncoated bakery product or by immersing the uncoated bakery product in it) and lowering the temperature to solidify the confectionery product by allowing it to cool (or by forced cooling). Suitable methods are well-known to those skilled in the art.

The coated bakery products may be further decorated with ingredients that adhere to the coating such as icing and/or chocolate strands or chips or sugar strands (which can be of a single colour or multi-coloured).

Confectionery products may also be coated with a composition of the invention. Suitable confectionery products include chocolates, chocolate-like products and jellies.

The listing or discussion of an apparently prior-published document in this specification should not necessarily be taken as an acknowledgement that the document is part of the state of the art or is common general knowledge.

Preferences and options for a given aspect, embodiment, feature or parameter of the invention should, unless the context indicates otherwise, be regarded as having been disclosed in combination with any and all preferences and options for all other aspects, embodiments, features and parameters of the invention. For example, the preferred features of the fat composition may be applied when the fat composition is used in the fat blend of the invention and the preferred features of the fat blend may be applied when the fat blend is used in the confectionery product.

The following non-limiting examples illustrate the invention and do not limit its scope in any way. In the examples and throughout this specification, all percentages, parts and ratios are by weight unless indicated otherwise.

EXAMPLES

Example 1

About 1200 gram of a blend of 40% by weight palm stearin with an iodine value of 14 and 60% by weight shea olein was chemically interesterified using sodium methoxide. The interesterified blend was dry fractionated at 40° C. The oil was first heated to 70° C. and then cooled down to 35° C. to 45° C. as follows:

from 70° C. down to 40° C. to 47° C. in 3 to 7 hours, hold for 2 to 8 hours at 40° C. to 47° C. and cooled further to 35° C. to 45° C. in 5 to 10 hours and hold at this temperature for 5 to 10 hours.

The crystals formed were separated by means of filter pressing. The slurry was pressed using the following program:

increase pressure from 0-24 bar in 60 min and squeeze 24 bar for 30 min.

In this way, about 19% stearin yield was obtained. The analytical results are shown in Table 1 (Product 1).

This stearin fraction is suitable for replacing hydrogenated palm oil 60 (hPO60) as crystallization/structuring agent.

Example 2

About 890 gram of a blend of 80% by weight palm stearin with an iodine value of 34 and 20% by weight shea olein was chemically interesterified using sodium methoxide. The interesterified blend was dry fractionated at 37° C. to 45° C. The oil was first heated to 70° C. and then cooled down to 37° C. to 45° C. as follows:

from 70° C. down to 48° C. to 52° C. in 1 to 5 hours, hold for 2 to 6 hours at 48° C. to 52° C. and cooled further to 37° C. to 45° C. in 5 to 10 hours and hold at this temperature for 5 to 10 hours.

The crystals formed were separated by means of filter pressing. The slurry was pressed using the following program:

increase pressure from 0-24 bar in 60 min and squeeze 24 bar for 30 min.

In this way, about 20% stearin yield was obtained. The analytical results are shown in Table 1 (Product 2).

This stearin fraction is suitable for replacing hydrogenated palm oil 60 (hPO60) as crystallization/structuring agent.

Example 3

About 1200 gram of a mixture of 50% by weight palm oil mid fraction (PMF IV34) and 50% by weight stearic acid was interesterified, which reaction was catalyzed by a 1,3-specific lipase derived from *Rhizopus oryzae*. The interesterified PMF (in (PMFIV34)) was solvent fractionated using acetone as solvent at 20° C. to 25° C. The solvent/oil mixture was cooled down to 20° C. to 25° C., while stirring. Formed crystals were filtered off and the solvent was evaporated by means of distillation. The top stearin fraction obtained (about 10% yield) could be used as an alternative for hydrogenated palm oil (hPO 60). The analytical results are shown in Table 1 (Product 3).

TABLE 1

Analytical results of different structuring agents as prepared in Examples 1-3.

| | Comparative example PO60 | Product 1 of Example 1 | Product 2 of Example 2 | Product 3 of Example 3 |
|---|---|---|---|---|
| IVFAME HIRES | 0.3 | 13.7 | 15.7 | 9.9 |
| FAME analysis | | | | |
| SAFA | 99.7 | 86 | 84.3 | 88.9 |
| MUFA | 0.3 | 12.1 | 13.1 | 10.8 |
| PUFA | 0 | 1.9 | 2.5 | 0.4 |
| C12:0 | 0.4 | 0.3 | 0.2 | 0 |
| C14:0 | 1.4 | 0.7 | 1 | 0.4 |
| C16:0 | 58.8 | 52.1 | 68.5 | 35.8 |
| C17:0 | 0.2 | 0.2 | 0 | 0.1 |
| C18:0 | 38.3 | 31.2 | 13.8 | 51 |
| C18:1 | 0.3 | 12 | 12.9 | 10.8 |
| C18:2 | 0 | 1.8 | 2.5 | 0.3 |
| C18:3 | 0 | 0.1 | 0.1 | 0 |
| Total Trans | 0.1 | 0.1 | 0.2 | 0.1 |
| C20:0 | 0.5 | 1.3 | 0.7 | 1.2 |
| C22:0 | 0.1 | 0.1 | 0.1 | 0.1 |
| C22:1 | 0 | 0 | 0 | 0 |
| C24:0 | 0.1 | 0.1 | 0.1 | 0.1 |
| Triglyceride composition | | | | |
| MPP | 2 | 1 | 1.9 | 0.3 |
| MOM | 0 | 0.1 | 0.1 | 0 |
| PPP | 27 | 20 | 42 | 7.2 |
| MOP | 0 | 0.3 | 0.7 | 0 |
| MLP | 0.2 | 0.4 | 0.2 | 0.1 |
| PPSt | 39.8 | 30.3 | 22.3 | 26.3 |
| POP | 0 | 5.8 | 11.1 | 2 |
| PLP | 0.1 | 0.9 | 2 | 0.1 |
| PStSt | 24.2 | 16.7 | 4.6 | 27.7 |
| POSt | 0 | 6.9 | 3.8 | 10.6 |
| POO | 0.1 | 3 | 4.5 | 0.1 |
| PLSt | 0 | 0.8 | 0.4 | 0.2 |
| PLO | 0 | 1 | 1.6 | 0.1 |
| PLL | 0 | 0.1 | 0.2 | 0 |
| StStSt | 5.4 | 3.8 | 0.6 | 6.1 |
| StOSt | 0.6 | 3.3 | 1.2 | 17.5 |
| StOO | 0 | 1.6 | 0.7 | 0.1 |
| StLSt | 0.1 | 0.2 | 0.1 | 0.4 |
| OOO | 0 | 0.9 | 0.7 | 0 |
| StLO | 0 | 0.4 | 0.2 | 0 |
| OLO | 0 | 0.4 | 0.4 | 0 |
| StLL | 0 | 0 | 0.1 | 0 |
| OLL | 0 | 0.5 | 0.2 | 0 |
| AStSt | 0.3 | 0 | 0 | 0.3 |
| AOSt | 0 | 0.2 | 0 | 0.5 |
| AOO | 0 | 0.1 | 0 | 0 |
| ALSt | 0 | 0 | 0 | 0 |
| Others | 0.2 | 1.2 | 0.5 | 0.1 |
| SUMSOS | 0.6 | 16 | 16.1 | 30.1 |
| Solid fat content in % | | | | |
| US-N10 | 99 | 93 | 95 | 99 |
| US-N20 | 98 | 92 | 92 | 98 |
| US-N25 | 98 | 89 | 89 | 89 |
| US-N30 | 98 | 86 | 85 | 81 |
| US-N35 | 98 | 81 | 79 | 83 |
| US-N40 | 97 | 74 | 71 | 75 |
| MDP (Mettler Drop Point) | 61.5 | 57.3 | 56.5 | 60.5 |

US-Nx refers to solid fat content determined by NMR on unstabilised fat at x° C.

MDP is the Mettler dropping point

IVFAME refers to calculated iodine value

Cx:y refers to a fatty acid having x carbon atoms and y double bonds; levels determined by GC-FAME M, O, P, St, L and A refer to myristic, oleic, palmitic, stearic, linoleic and arachidic acids, respectively Triglyceride composition MPP, etc, was determined by GC (ISO 23275) and includes triglycerides having the same fatty acids in different positions e.g., MPP includes MPP and PMP SUMSOS refers to total SOS (S is stearic or palmitic acid and O is oleic acid)

Example 4

The structuring property was determined by measuring the hardness. Palm olein with iodine value of 64 was used as liquid oil. To 120 gram POfIV64 was added 3% (wt) of the Products 1-3. The oil blend was heated to 60° C. followed by cooling down to room temperature. The cooled samples were stored for 3 days at 10° C. The samples were measured using a Brookfield texture analyzer. Samples were taken from the refrigerator (10° C.) and penetrated once with a 12.7 mm diameter plastic cylindrical probe. The maximal force (measured in compression) was recorded and mentioned as maximal hardness. The speed and distance of penetration were set to 2.0 mm/s and 10 mm, respectively. The results are shown in Table 2.

TABLE 2

Hardness measured at room temperature of different blends stored at 10° C. for 3 days.

| | Comparative example PO60 | Product 1 of Example 1 | Product 2 of Example 2 | Product 3 of Example 3 |
|---|---|---|---|---|
| Hardness (g) (POfIV64 + 3%) | 194.7 | 332.6 | 223.9 | 234.3 |
| ratio $P_2St/PPP$ | 1.47 | 1.52 | 0.53 | 3.65 |
| $P_2St + PSt_2$ | 64 | 47 | 26.9 | 54 |

The invention claimed is:

1. A fat composition which is the stearin fraction of a product obtained by interesterifying a mixture of palm oil stearin and shea olein and which comprises:
    greater than 75% by weight palmitic acid and stearic acids;
    from 1 to 25% by weight oleic acid; and
    greater than 20% by weight of combined P2St and $PSt_2$ triglycerides, wherein P is palmitic acid and St is stearic acid;
    wherein the fat composition has a weight ratio of $P_2St$:PPP triglycerides of greater than 0.5.

2. The fat composition as claimed in claim 1 comprising greater than 55% by weight in total of the triglycerides PPP, $P_2St$ and PSt2, wherein P is palmitic acid and St is stearic acid.

3. The fat composition as claimed in claim 1 comprising from 10% to 60% by weight of stearic acid.

4. The fat composition as claimed in claim 1 comprising from 5 to 20% by weight of oleic acid.

5. A fat blend comprising from 0.5 to 10% by weight of the fat composition of claim 1 and from 90 to 99.5% by weight of one or more other fats.

6. The fat blend as claimed in claim 5 comprising at least 80% by weight of a lauric fat component.

7. The fat blend as claimed in claim 6, wherein the lauric fat component is selected from the group consisting of coconut oil, palm kernel oil, fractions of coconut oil, fractions of palm kernel oil, and mixtures thereof.

8. The fat blend as claimed in claim 5 comprising at least 30% by weight of one or more non-hydrogenated palm fractions.

9. The fat blend as claimed in claim 8, wherein the non-hydrogenated palm fraction is a palm olein.

10. A confectionery product comprising: at least 20% by weight of the fat blend according to claim 5; and at least 30% by weight sugar.

11. The confectionery product as claimed in claim 10 comprising at least 5% of milk powder, vegetable milk powder or a mixture thereof.

12. The confectionery product as claimed in claim 10 which is a confectionery filling comprising at least 5% of a nut based material.

13. A process for making the fat composition of claim 1 comprising the following steps:
   (a) providing a palm oil stearin having an iodine value (IV) of from 10 to 40;
   (b) interesterifying the palm oil stearin of step (a) with shea olein; and
   (c) fractionating the interesterified product of step (b) to produce a stearin fraction at a yield based on the interesterified product of step (b) of from 8 to 25% by weight.

14. A method of promoting, enhancing or accelerating the crystallization of fat or fat blends in confectionery or bakery applications, comprising adding the fat composition according to claim 1.

* * * * *